United States Patent
Egevang

(10) Patent No.: US 7,159,109 B2
(45) Date of Patent: Jan. 2, 2007

(54) METHOD AND APPARATUS TO MANAGE ADDRESS TRANSLATION FOR SECURE CONNECTIONS

(75) Inventor: Kjeld B. Egevang, Smorum (DK)

(73) Assignee: Intel Corporation, Santa Clara, CA (US)

( * ) Notice: Subject to any disclaimer, the term of this patent is extended or adjusted under 35 U.S.C. 154(b) by 878 days.

(21) Appl. No.: 10/005,972

(22) Filed: Nov. 7, 2001

(65) Prior Publication Data

US 2003/0088787 A1  May 8, 2003

(51) Int. Cl.
*H04L 29/02* (2006.01)
*H04L 13/18* (2006.01)
*H04L 13/16* (2006.01)

(52) U.S. Cl. .................. 713/160; 713/163; 726/13
(58) Field of Classification Search .................. 713/160

See application file for complete search history.

(56) References Cited

U.S. PATENT DOCUMENTS 6,119,171 A * 9/2000 Alkhatib .................... 709/245

FOREIGN PATENT DOCUMENTS

EP       1 130 846 A2    9/2001
EP       1130846 A2  *  9/2001

* cited by examiner

*Primary Examiner*—Kambiz Zand
*Assistant Examiner*—Venkat Perungavoor
(74) *Attorney, Agent, or Firm*—Kacvinsky LLC

(57) ABSTRACT

Techniques to manage address translation for secure connections are described. An apparatus may include a secure connection manager. The secure connection manager may comprise a flow module to create a list of identifiers, with each identifier representing a secure flow terminating at a device with an internal address. The secure connection manager may also comprise a translation module to select an internal address for an encrypted packet having an external address and a flow identifier. Other embodiments are described and claimed.

28 Claims, 6 Drawing Sheets

METHOD AND APPARATUS TO MANAGE ADDRESS TRANSLATION FOR SECURE CONNECTIONS

BACKGROUND

Network security is becoming increasingly important as more sensitive information is being transmitted over communications networks, particularly the Internet. As a result, a number of security techniques have evolved to protect data during transport. Certain networking technologies, however, may need access to the protected data to function. For example, address translation permits a network to translate a number of addresses into a single address, and vice-versa, which is particularly useful for local area networks (LANs). Address translation, however, may be difficult to perform using protected data. Therefore, there may be a substantial need to perform address translation for protected data while retaining some of the advantages of both techniques.

SUMMARY

In one embodiment, for example, an apparatus may include a secure connection manager. The secure connection manager may comprise a flow module to create a list of identifiers, with each identifier representing a secure flow terminating at a device with an internal address. The secure connection manager may also comprise a translation module to select an internal address for an encrypted packet having an external address and a flow identifier.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Figure 1:
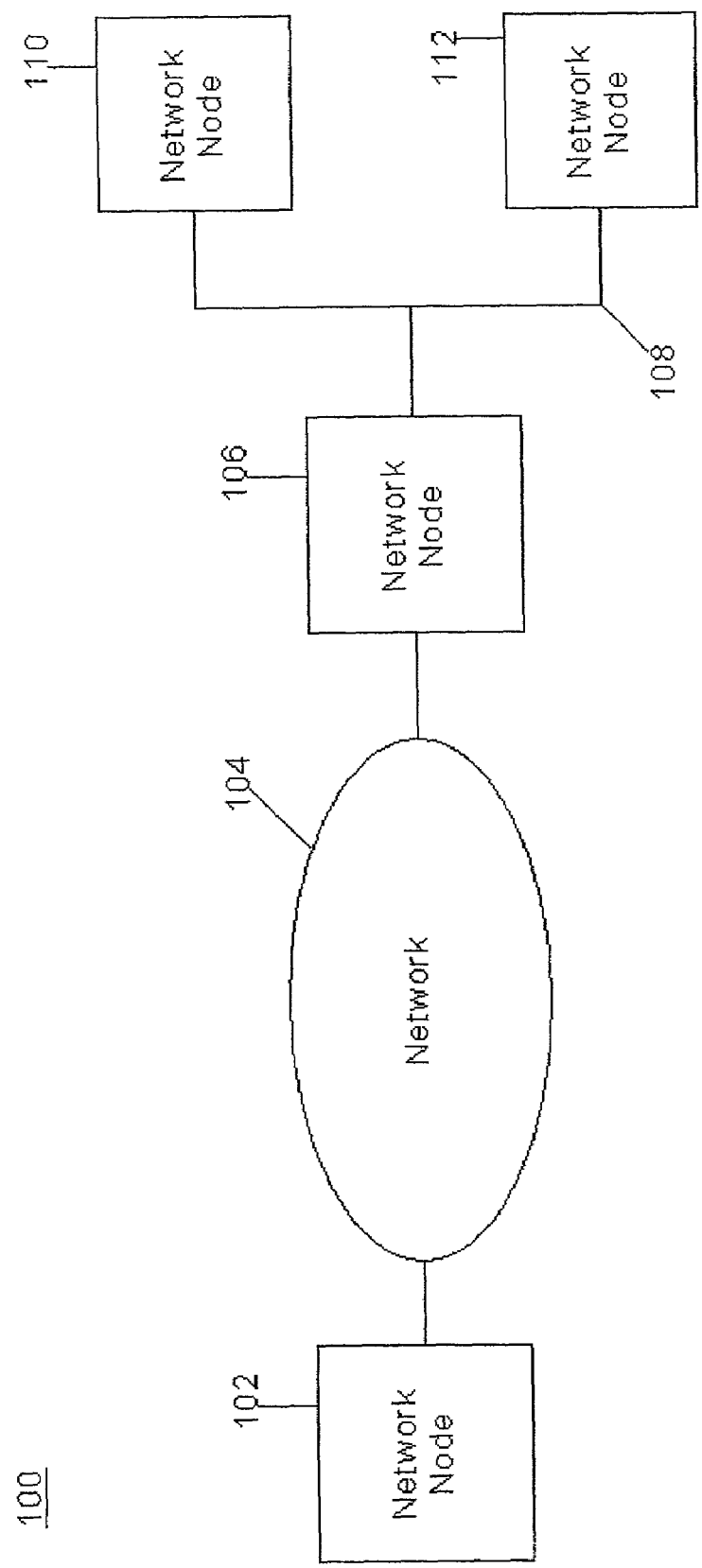
FIG. 1 is a block diagram of a system suitable for practicing one embodiment of the invention.

In the following detailed description, numerous specific details are set forth in order to provide a thorough understanding of the embodiments of the invention. It will be understood by those skilled in the art, however, that embodiments of the invention may be practiced without these specific details. In other instances, well-known methods, procedures, components and circuits have not been described in detail so as not to obscure the foregoing embodiments of the invention.

Embodiments of the invention may improve performance of a communications network, such as a packet switching network. One embodiment of the invention improves performance of a packet switching network by improving management of a Security Association (SA), also referred to herein as a "secure connection." An SA may define a relationship between two or more entities that describes how the entities will utilize security services to communicate securely. This relationship is represented by a set of information that can be considered a contract between the entities. The information should be agreed upon and shared between all the entities. Sometimes the information alone is referred to as an SA, but this is typically a physical instantiation of the existing relationship. The existence of this relationship, represented by the information, is what provides the agreed upon security information to allow entities to securely interoperate.

More particularly, one embodiment of the invention manages address translation for secure connections. Address translation in this context may refer to translating a large number of addresses into fewer or a single address, and vice-versa. One embodiment of the invention may manage address translation for a secure connection by using a set of heuristics to determine routing information for a packet. Consequently, this may improve the overall capacity and performance of a network. Accordingly, users may benefit from faster response times from network applications and services.

Packet switching continues to be an effective technology for voice and data communications. Packet switching in this context may refer to communicating information over a network in the form of relatively short packets. A packet in this context refers to a set of information of a limited length, with the length typically represented in terms of bits or bytes. An example of a packet length might be 1000 bytes. A network typically comprises a number of network nodes interconnected by a communications medium. The network nodes may be capable of communicating information to other network nodes over the communications medium using one or more protocols. A network node in this context may include any device capable of communicating information, such as a computer, server, switch, router, bridge, gateway and so forth. A communications medium may be any medium capable of carrying information signals, such as twisted-pair wire, co-axial cable, fiber optics, radio frequencies and so forth. A protocol may comprise a set of instructions by which the information signals are communicated over the communications medium. For example, the protocol might be a packet switching protocol such as the Transmission Control Protocol (TCP) as defined by the Internet Engineering Task Force (IETF) standard 7, Request For Comment (RFC) 793, adopted in September, 1981 ("TCP Specification"), and the Internet Protocol (IP) as defined by the IETF standard 5, RFC 791 ("IP Specification"), adopted in September, 1981, both available from "www.ietf.org" (collectively referred to herein as the "TCP/IP Specification").

A packet switching network may comprise a number of network nodes, such as a source node, a destination node, and intermediate nodes. The source node may comprise a node that originates a set of information for delivery to the destination node. Information may comprise any data capable of being represented as a signal, such as an electrical signal, optical signal, acoustical signal and so forth. Examples of information in this context may include data from a voice conversation, videoconference, streaming video, electronic mail ("email") message, voice mail message, graphics, image, video, text and so forth. The destination node may comprise a node that receives information. The intermediate nodes may comprise nodes that communicate the information from the source node to the destination node. To assist in routing information between a source node, intermediate node(s) and a destination node, each node may be assigned a network address, such as an IP address.

In operation, the source node may send information to the destination node through one or more intermediate nodes in the form of packets. The source node breaks a set of information into a series of packets. Each packet may contain a portion of the information plus some control information. The control information may assist intermediate nodes in the network to route each packet to the destination node. The source node sends the packets over the network, where an intermediate node receives the packets, stores them briefly, and passes them to the next intermediate node. This continues to occur until the destination node eventually receives the entire series of packets and uses them to reproduce the information from the source node.

Packets are typically sent in "clear text." This means that any device may have access to the information within a packet, including the header information and packet data. Under certain circumstances, it may be desirable to use a security technique to prevent unauthorized users or devices from accessing packet information. Packets may be protected using a number of security techniques, such as in accordance with an IP security ("IPSec") protocol as defined in IETF RFC 2401, 2406, 2407, 2408, 2409 and others. A security protocol typically includes encryption and decryption algorithms to protect a packet of data during transport. This may be useful, for example, in creating a virtual private network (VPN) between two devices using physical connections shared with other network nodes.

In one embodiment of the invention, a secure connection may be created in accordance with the IETF proposed standard titled "Internet Security Association and Key Management Protocol," RFC 2408, published in November, 1998 ("ISAKMP Specification"), for example. The ISAKMP Specification describes a protocol utilizing security concepts useful for establishing secure connections and cryptographic keys in an Internet environment. For example, the ISAKMP Specification may provide the protocol exchanges to establish a secure connection between negotiating entities followed by the establishment of a secure connection by these negotiating entities on behalf of some protocol. An example of such a protocol may be a protocol as set forth in the IP Encapsulating Security Protocol (ESP), as set forth in the IETF Proposed Standard RFC 2406, published in November 1998 ("ESP Specification"). The ISAKMP Specification may further define procedures for authenticating a communicating peer, creation and management of secure connections, key generation techniques, and threat mitigation (e.g., denial of service and replay attacks). All of these functions may be desirable to establish and maintain secure communications in an Internet environment.

Secure connections and encrypted packets, however, may create a problem for network nodes configured to perform network address translation (NAT). NAT enables a network such as a LAN to use one set of IP addresses for internal traffic ("internal addresses") and a second set of addresses for external traffic ("external addresses"). For example, a NAT device may operate to act as a gateway between a LAN and another network, with each network node on the LAN ("internal node") having a separate internal address. Whenever a network node from the LAN sends a packet to a network node outside of the LAN ("external node"), it may pass through the NAT device. The NAT device may translate the internal address for the internal node to an external address that is shared by all the internal nodes. Similarly, whenever an external node sends a packet to an internal node, the NAT device may translate the shared external address to an internal address for the appropriate internal node. This may provide several advantages, such as increasing the number of IP addresses for a client or organization, and reducing the possibility of conflict with IP addresses used by other companies and organizations. A NAT device typically needs information from the header of a packet, however, to properly perform NAT. This information may comprise, for example, the IP address and User Datagram Protocol (UDP) or TCP port number. A NAT device may not be able to retrieve such information from an encrypted packet.

Conventional solutions to this problem are unsatisfactory for a number of reasons. For example, one solution might be to encapsulate encrypted packets into UDP or TCP packets prior to performing NAT. This would be proprietary method, however, that many conventional network nodes may not be configured to perform. Another solution might be to include a NAT device as part of the secure connection. This may create a potential security breach since users of the NAT device may gain access to information sent over the secure connection.

Embodiments of the invention, as described in more detail hereinafter, may manage address translations over secure connections in a manner that may reduce or eliminate these and other problems. In one embodiment of the invention, a secure connection address manager (SCAM) may manage a list of secure connections between internal nodes and external nodes. This list may be referred to herein as a "flow list." A "flow" in this context may refer to a flow of packets associated with, or comprising, a secure connection, for example. The SCAM may create the flow list by monitoring for a particular encrypted packet that designates the beginning of a flow. In one embodiment of the invention, the SCAM monitors for an ESP packet having a sequence number of one (1). Typically, the ESP with this sequence number indicates the beginning of a flow of packets. The SCAM then records an identifier for the ESP packet, along with a time stamp of when the ESP packet was received, as part of the flow list. An example of the identifier may be a security parameter index (SPI), which is used to assist in identifying an ESP packet. Whenever the SCAM receives an ESP packet from an external node with an external address as the destination address for one of the internal nodes in a LAN, the SCAM may try to match an identifier for the external node ESP packet with an identifier for an ESP packet stored in the flow list. For example, the SCAM may select an ESP packet identifier having the oldest time stamp from the flow list. In an alternative embodiment of the invention, the SCAM may determine which ISAKMP flow is most active and forward the packet to the appropriate internal address accordingly. The embodiments of the invention may be described in more detail below.

It is worthy to note that any reference in the specification to "one embodiment" or "an embodiment" means in this context that a particular feature, structure, or characteristic described in connection with the embodiment may be included in at least one embodiment of the invention. The appearances of the phrase "in one embodiment" in various places in the specification do not necessarily all refer to the same embodiment.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a network node 102 connected to a network 104. Network node 106 may be connected to network 104, as well as network nodes 110 and 112 via a LAN 108. Although FIG. 1 shows a limited number of network nodes, it can be appreciated that any number of network nodes may be used in system 100 and still fall within the scope of the invention. Furthermore, the terms "connection" and "interconnection," and variations thereof, in this context may refer to physical connections and/or logical connections.

In one embodiment of the invention, network node 102 may be a source node capable of configuring a secure connection with a destination node, such as network nodes 110 and/or 112. Network node 102 may be an example of an external node as described above. Network node 106 may be a network node such as a router configured to perform NAT for network nodes 110 and 112. In one embodiment of the invention, LAN 108 comprises network nodes 106, 110 and 112, configured to communicate with each other in accordance with one or more Ethernet protocols, for example. Network nodes 110 and 112 may be examples of an internal node as described above. In one embodiment of the invention, network 104 may comprise network nodes configured to communicate information in accordance with one or more Internet protocols, such as in accordance with the TCP/IP Specification.

In one embodiment of the invention, network node 102 may be configured to establish a secure connection with another network node, such as network nodes 110 or 112. Network nodes 110 and 112 are also configured to establish a secure connection with another network node, such as network node 102. In one embodiment of the invention, network nodes 102, 110 and 112 may create a secure connection in accordance with the ISAKMP Specification and the ESP Specification, although the embodiments of the invention are not limited in this context.

Figure 2:
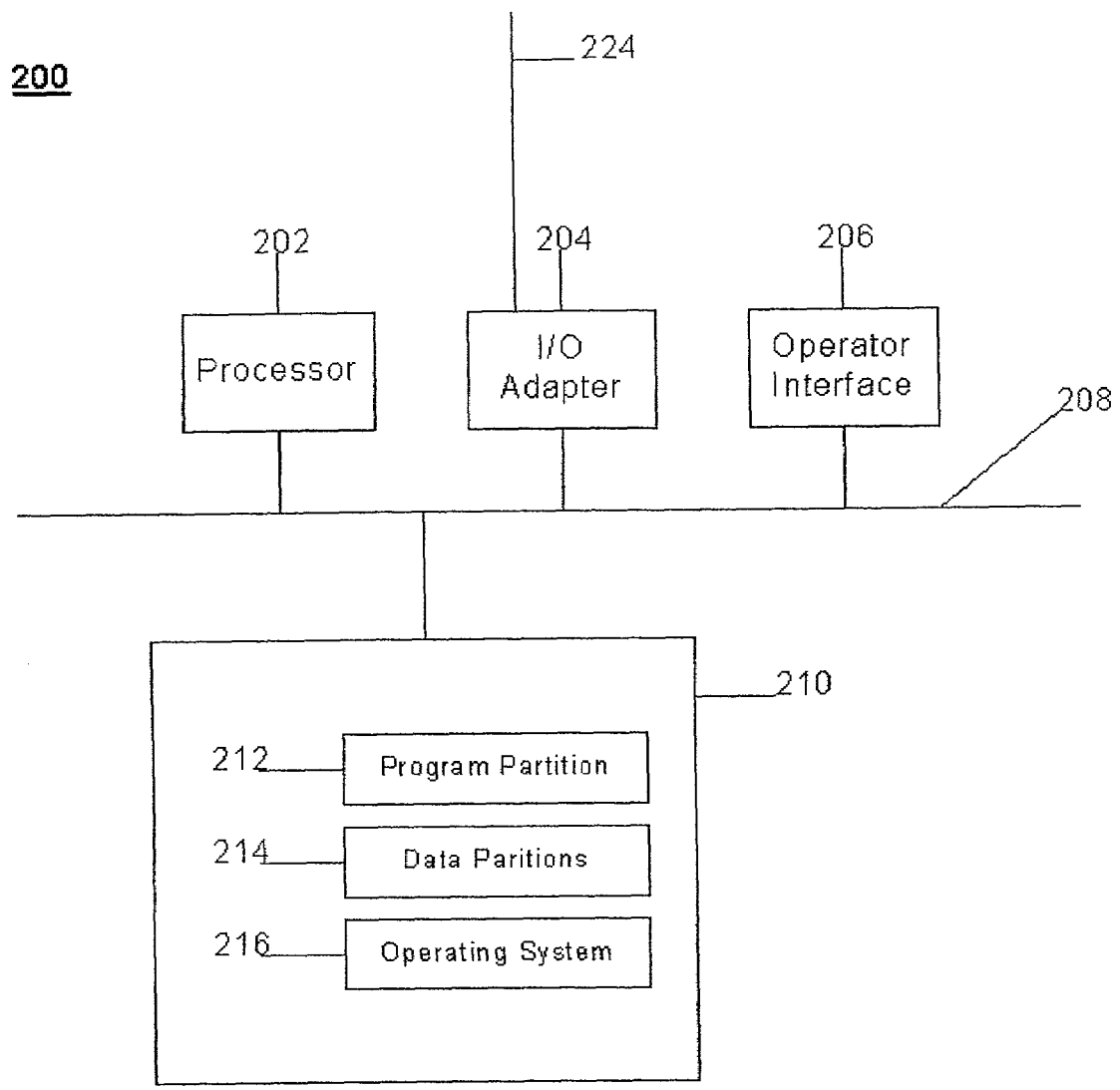
FIG. 2 is a block diagram of a node in accordance with one embodiment of the invention.

FIG. 2 is a block diagram of a node in accordance with one embodiment of the invention. FIG. 2 illustrates a node 200 that may be representative any network node shown in FIG. 1, including network node 106 configured to perform NAT. Network node 106 may perform NAT in accordance with, for example, the information specification titled "Traditional IP Network Address Translator," as defined by RFC 2022, published January 2001 ("NAT Specification"), as modified by the principles set forth herein.

Node 200 may comprise a computer platform. In this embodiment of the invention, node 200 comprises a processor 202, an input/output (I/O) adapter 204, an operator interface 206, and a memory 210. Memory 210 may store computer program instructions and data. Processor 202 may execute the program instructions, and process the data, stored in memory 210. I/O adapter 204 may communicate with other devices and transfer data in and out of intermediate node 200 over connection 224. Operator interface 206 may provide an interface between a user and OS 216. Operator interface 206 may communicate commands between the user and OS 216, and provides status information to the user. All the elements are interconnected by bus 208, which allows data to be intercommunicated between the elements. I/O adapter 204 may represent one or more I/O adapters or network interfaces that can connect to local or wide area networks such as, for example, network 200. Therefore, connection 224 may represent a connection to a network or a direct connection to other equipment. It can be appreciated that node 200 may have any number of I/O adapters and connections, such as I/O adapter 204 and connection 224, and still fall within the scope of the invention.

Processor 202 can be any type of processor capable of providing the speed and functionality desired to implement embodiments of the invention. For example, processor 202 may be a processor from a family of processors made by Intel Corporation, Motorola, Compaq, AMD Corporation and Sun Microsystems.

Memory 210 may comprise any media capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM) and any other device or signal that can store digital information. In one embodiment, the instructions may be stored on the medium in a compressed and/or encrypted format. As used herein, the phrase "adapted to be executed by a processor" is meant to encompass instructions stored in a compressed and/or encrypted format, as well as instructions that may be compiled or installed by an installer before being executed by the processor. Further, node 200 may contain various combinations of machine-readable storage devices through other I/O controllers, which are accessible by processor 202 and which are capable of storing a combination of computer program instructions and data.

In one embodiment of the invention, memory 210 comprises an operating system 216, a program partition 212 and a data partition 214. Program partition 212 may store and allow execution by processor 202 of program instructions that implement the functions of each respective node described herein, such as network nodes 102, 106, 110 and 112. Data partition 214 may store data to be used during the execution of program instructions.

I/O adapter 204 may be a network interface that may comprise any suitable technology for controlling communication signals between network devices using a desired set of communications protocols, services and operating procedures. In one embodiment of the invention, I/O adapter 204 operates in accordance with the TCP/IP Specification, although the embodiments of the invention are not limited in this context.

I/O adapter 204 also includes connectors for connecting I/O adapter 204 with a suitable communications medium. Those skilled in the art will understand that I/O adapter 204 may receive information signals over any suitable communication medium such as twisted-pair wire, co-axial cable, fiber optics, radio frequencies, and so forth.

Figure 3:
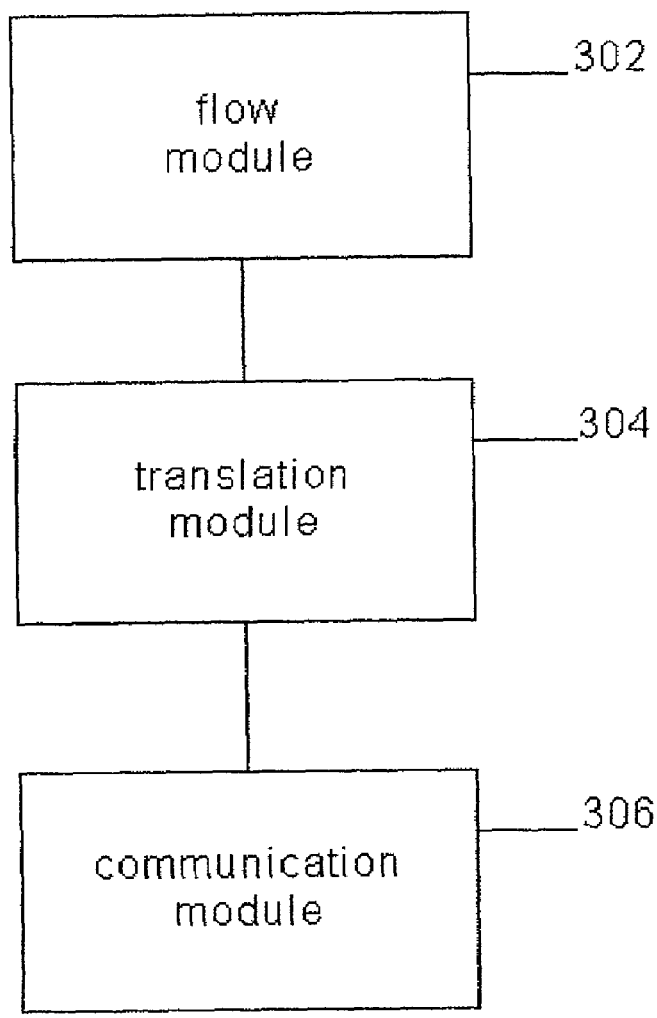
FIG. 3 is a block diagram of a program partition in accordance with one embodiment of the invention.

FIG. 3 is a block diagram of a program partition in accordance with one embodiment of the invention. FIG. 3 illustrates a program partition that may be representative of program partition 212, with the program partition having a secure connection address manager (SCAM) 300. In this embodiment, SCAM 300 may contain program instructions to manage address translation for secure connections over a NAT device, such as network node 106. More particularly, SCAM 300 may utilize three sets of program instructions referred to herein as a flow module 302, a translation module 304, and a communication module 306, respectively. Of course, the scope of the invention is not limited to these particular sets of instructions.

The operations of systems 100 and 200, and modules 300, 302, 304 and 306, may be further described with reference to FIGS. 4–6 and accompanying examples. Although FIGS. 4–6 as presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 4:
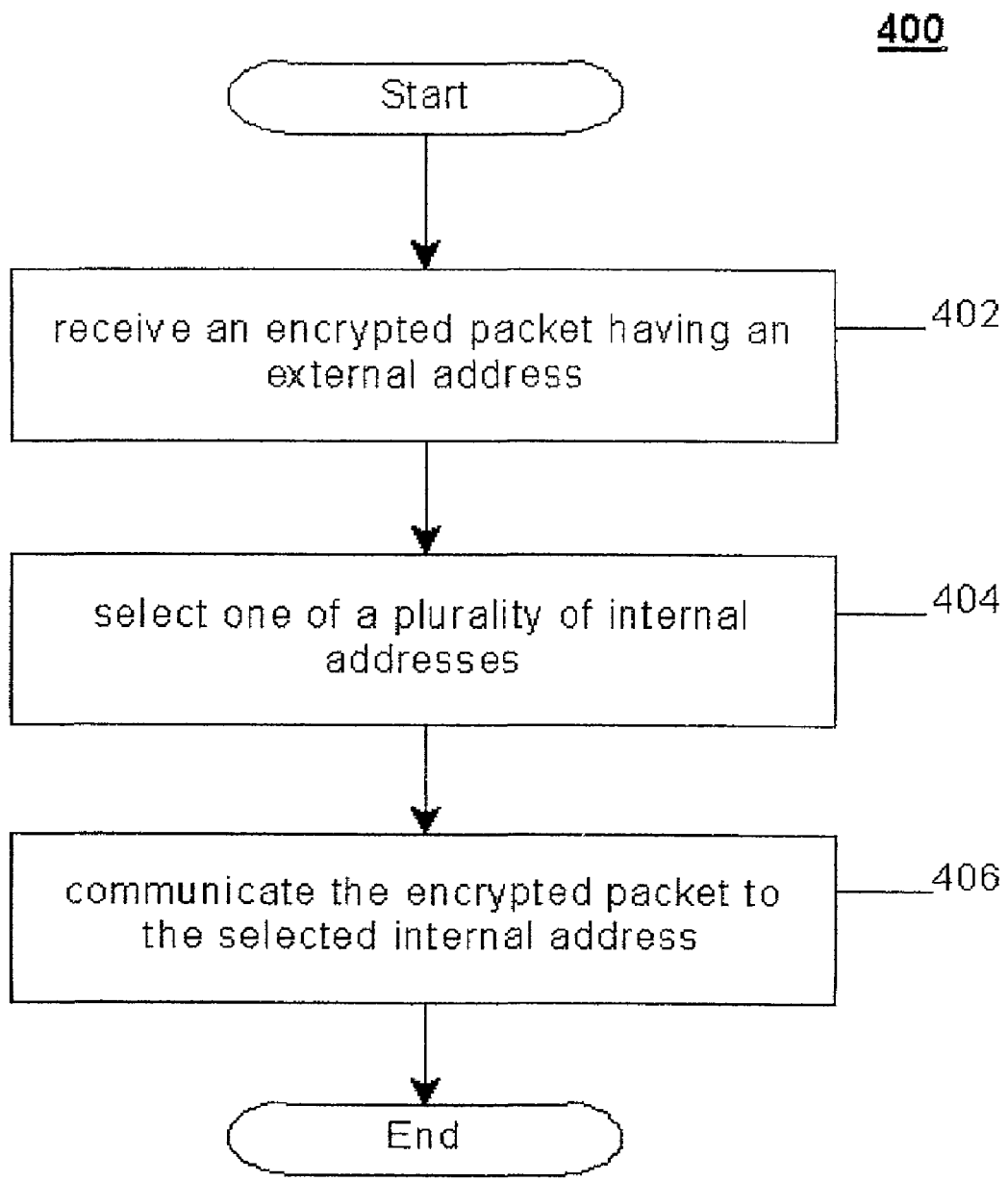
FIG. 4 is a first block flow diagram of the processing logic performed by a secure connection address manager (SCAM) in accordance with one embodiment of the invention.

FIG. 4 is a first block flow diagram of the processing logic performed by a SCAM in accordance with one embodiment of the invention. Processing logic 400 may illustrate a method to manage address translation for secure connections. An encrypted packet having an identifier and an external address that represents a plurality of internal addresses is received at block 402. One of the internal addresses is selected at block 404. The encrypted packet is communicated to the selected internal address at block 406.

Figure 5:
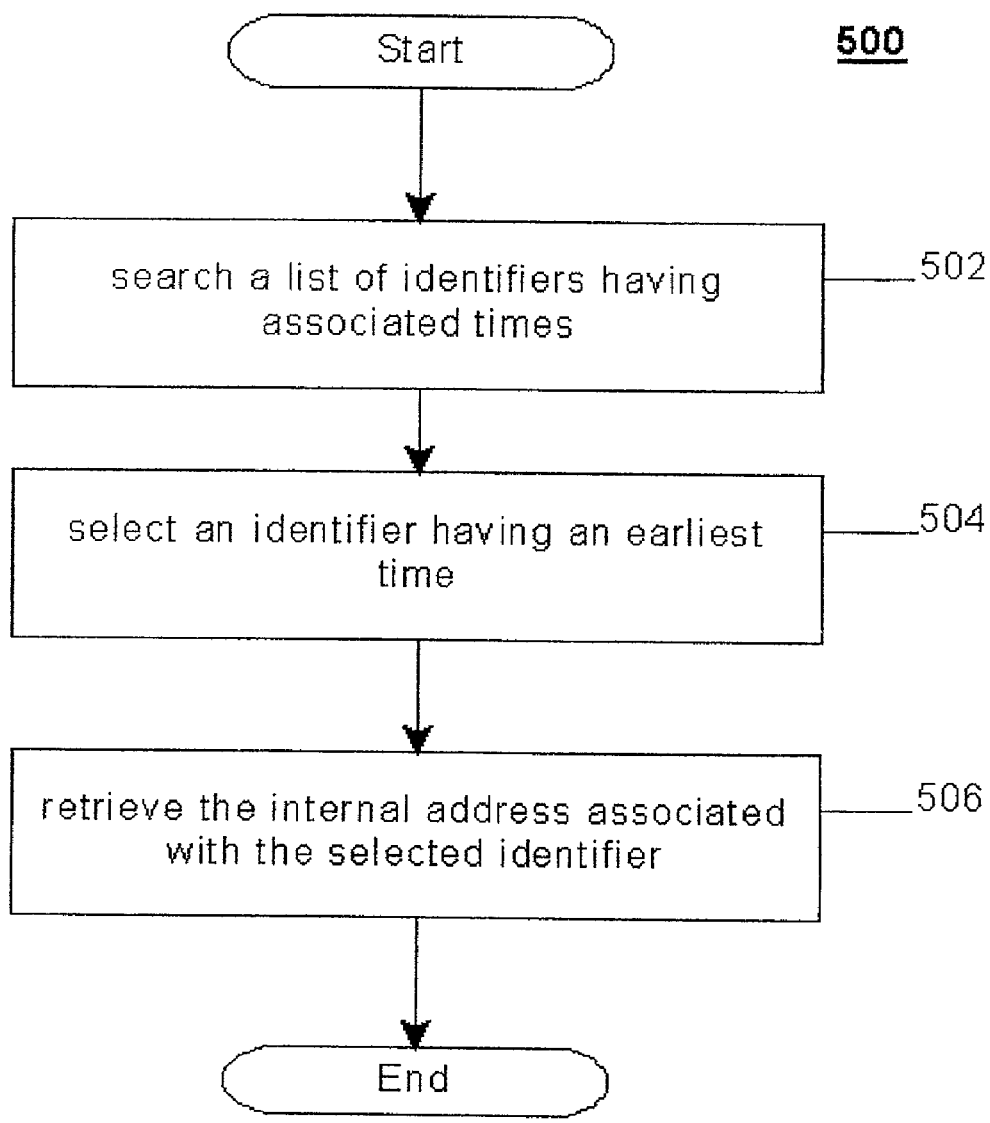
FIG. 5 is a second block flow diagram of the processing logic for a SCAM in accordance with one embodiment of the invention.

FIG. 5 is a second block flow diagram of the processing logic performed by a SCAM in accordance with one embodiment of the invention. Processing logic 500 may illustrate a method to manage address translation for secure connections, and more particularly, to select an internal address from a flow list. A list of identifiers having associated times may be searched at block 502. An identifier having an earliest time may be selected at block 504. An internal address associated with the selected identifier may be retrieved at block 506.

In one embodiment of the invention, a list may be searched as follows. A flow list is first created. The created list may then be searched. The list may be created by receiving an encrypted packet having a predetermined sequence number and an identifier from a device associated with one of the internal addresses mentioned above. A determination may be made as to a time when the packet was received. The time and the internal address may be associated with the identifier and stored in memory.

In one embodiment of the invention, the packet may be encrypted in accordance with the ISAKMP Specification, for example. The encrypted packet may be, for example, an ESP encrypted packet. The identifier may be, for example, a SPI.

In one embodiment of the invention, an internal address may not be found for the encrypted packet, or the encrypted packet may have been sent to the incorrect internal address. In this case, the NAT device may receive a message that the encrypted packet was communicated to an incorrect internal address, and determine an activity level for each tunnel terminating at each device represented by the plurality of internal addresses. The encrypted packet may then be communicated to an internal address having a tunnel with a highest activity level.

Figure 6:
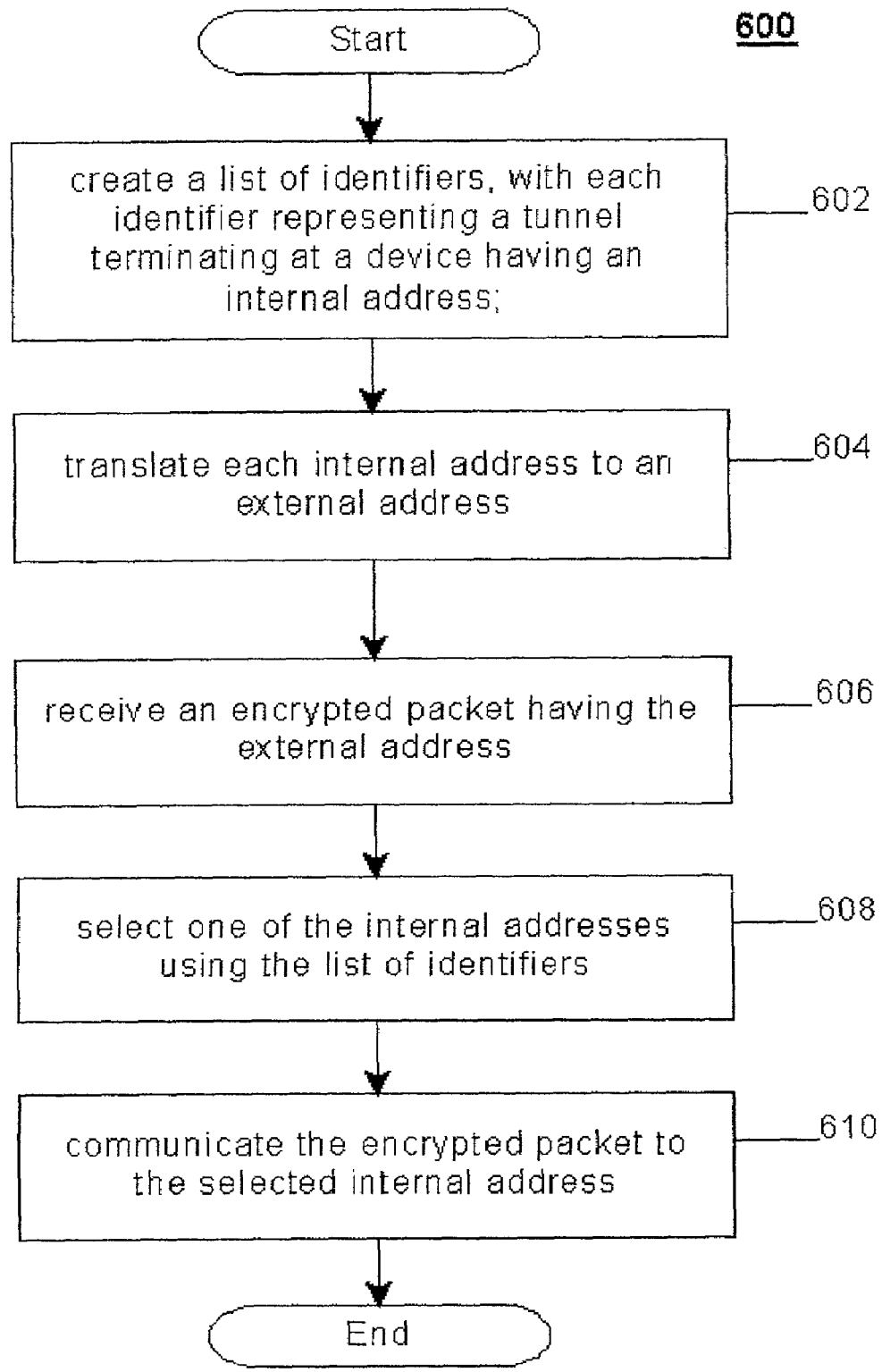
FIG. 6 is a third block flow diagram of the processing logic for a SCAM in accordance with one embodiment of the invention.

FIG. 6 is a third block flow diagram of the processing logic performed by a SCAM in accordance with one embodiment of the invention. Processing logic 600 may illustrate a method to manage address translation for secure connections. A list of identifiers may be created at block 602. Each identifier in the list may represent a tunnel terminating at a device having an internal address. Each of the internal addresses is translated to an external address at block 604. An encrypted packet having the external address may be received at block 606. One of the internal addresses may be selected using the list of identifiers at block 608. The encrypted packet may be communicated to the selected internal address at block 610.

The operations of systems 100 and 200, and modules 300, 302, 304 and 306, may be further described using the following example. Assume that a network node such as network node 110 is directed to create a secure connection with network node 102. Network node 112 may negotiate for the secure connection in accordance with, for example, the ISAKMP Specification. For example, the ISAKMP Specification may provide the protocol exchanges to establish a secure connection between negotiating entities followed by the establishment of a secure connection by these negotiating entities on behalf of some protocol. An example of such a protocol may be a protocol as set forth in the ESP Specification. First, an initial protocol exchange allows a basic set of security attributes to be agreed upon. This basic set provides protection for subsequent ISAKMP exchanges. It also indicates the authentication method and key exchange that will be performed as part of the ISAKMP protocol. After the basic set of security attributes has been agreed upon, initial identity authenticated, and required keys generated, the established SA can be used for subsequent communications by the entity that invoked ISAKMP.

As part of the negotiating process to set up the secure connection, network node 110 may begin sending packets to network node 102 via network node 106. In one embodiment of the invention, network node 106 is a router configured to perform NAT in accordance with, for example, the NAT Specification. Network node 106 may also be configured with a SCAM, such as a SCAM 300. Network node 106 may notify the source/destination addresses and the source/destination ports for the UDP flow used for the ISAKMP. Network node 106 may translate the internal address for network node 110 into a single external address used by network node 106 for all packets originating from LAN 108.

Similarly, assume network node 112 also begins the negotiation process for a secure connection to network node 102 via network node 106 using ISAKMP. Network node 106 may perform the same notification and translation process as performed for the secure connection of network node 110. If the UDP source port for network node 112 is the same as the UDP source port for network node 110, it is translated to an unused value.

Assume network node 110 sends its first encrypted ESP packet. Flow module 302 may use the ESP packet to create a flow list. The flow list may be created by, for example, inspecting the negotiation of a secure connection. In this example, a secure connection may be created in accordance with ISAKMP Specification. According to the ISAKMP Specification, all secure connections are created using a particular port number, which is port 500. Flow module 302 may be configured to monitor all flows having an outbound destination port 500 or inbound source port 500, and retrieve an SPI for all ESP packets having a particular sequence number, such as sequence number 1. This packet typically identifies the beginning of a flow. Flow module 302 of SCAM 300 may receive this ESP packet and retrieve its SPI. Flow module 302 may then store the retrieved SPI and a time stamp in its flow table, along with the internal address for network node 110. The ESP packet may then be forwarded to network node 102 by, for example, communication module 306.

Assume network node 112 sends its first ESP packet. Flow module 302 may then create a new entry in the flow table using the SPI and timestamp for this packet, and the internal address of network node 112.

Network node 102 may send its first ESP packet to network node 106. Network node 102 does this since the destination address it received from the ESP packets sent to it by network nodes 110 and 112 was a single external address identifying network node 106. Network node 106 must now determine whether the ESP packet from network node 102 is for network node 110 or network node 112. Translation module 304 of SCAM 300 may accomplish this by searching for the oldest unmatched ESP packet in the flow list having a sequence number 1. Since the oldest ESP was the one from network node 110, translation module 304 retrieves the internal address for network node 110 and passes this information to communication module 306. Communication module 306 may forward the ESP packet from network node 102 to network node 110 using the retrieved internal address. Afterwards, network node 106 may forward packets having the same SPI as the first ESP packet to the same internal address.

Network node 102 may send a second ESP packet to network node 106. Again, network node 106 must now determine whether the ESP packet from network node 102 is for network node 110 or network node 112. Translation module 304 accesses its flow table to search for the oldest unmatched ESP packet in the flow list having a sequence number 1. This is the ESP packet from network node 112. Translation module 304 retrieves the internal address for network node 112 and passes this information to communication module 306. Communication module 306 may forward the ESP packet from network node 102 to network node 112 using the retrieved internal address. Afterwards, network node 106 may forward packets having the same SPI as the second ESP packet to the same internal address.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to manage secure connections, comprising:
   receiving a first initial encrypted packet transmitted from an internal node and addressed to a secure port of an external node;
   recording an unmatched flow comprising an internal address and a security identifier associated with said first initial encrypted packet in a list to designate a secure connection between said internal node and said external node;
   receiving a second initial encrypted packet having a security identifier and an external address that represents a plurality of internal addresses;
   translating said external address of said second initial encrypted packet by selecting one of said internal addresses associated with an oldest or most recently active unmatched flow recorded in said list;
   communicating said second initial encrypted packet to said selected internal address; and
   forwarding a subsequent encrypted packet having a security identifier that matches said security identifier of said second initial encrypted packet to said selected internal address.

2. The method of claim 1, further comprising:
   searching a list of security identifiers having associated times;
   selecting a security identifier having an earliest time; and
   retrieving said internal address associated with said selected security identifier.

3. The method of claim 2, further comprising:
   creating said list; and
   searching said created list.

4. The method of claim 3, wherein said creating comprises:
   receiving an encrypted packet having a predetermined sequence number and a security identifier from a device associated with one of said internal addresses;
   determining a time said encrypted packet was received;
   associating said time and said internal address with said security identifier; and
   storing said security identifier with said associated time and associated internal address.

5. The method of claim 1, wherein said packet is encrypted in accordance with the Internet Security Association And Key Management Protocol (ISAKMP).

6. The method of claim 1, wherein said encrypted packet is an Internet Protocol (IP) Encapsulating Security Payload (ESP) encrypted packet.

7. The method of claim 1, wherein said security identifier is a security parameter index (SPI).

8. The method of claim 1, wherein said security identifier represents a tunnel between two devices, and further comprising:
   receiving a message that said encrypted packet was communicated to an incorrect internal address;
   determining activity levels for each tunnel terminating at each device represented by said plurality of internal addresses; and
   communicating said encrypted packet to an internal address having a tunnel with a highest activity level.

9. A method to manage secure connections, comprising:
   creating a list of unmatched flows comprising security identifiers to designate secure connections by storing security identifiers in response to receiving initial encrypted packets addressed to a secure port, with each security identifier representing a tunnel terminating at a device having an internal address;
   translating each of said internal addresses to an external address;
   receiving an initial encrypted packet having said external address and a security identifier;
   translating said external address of said initial encrypted packet by selecting one of said internal addresses associated with an oldest or most recently active unmatched flow from said list;
   communicating said initial encrypted packet to said selected internal address; and
   forwarding a subsequent encrypted packet having a security identifier that matches said security identifier of said initial encrypted packet to said selected internal address.

10. The method of claim 9, wherein said tunnel is created in accordance with the Internet Security Association And Key Management Protocol (ISAKMP).

11. The method of claim 9, wherein said encrypted packet is an Internet Protocol (IP) Encapsulating Security Payload (ESP) encrypted packet.

12. The method of claim 9, wherein said security identifier is a security parameter index (SPI).

13. The method of claim 9, further comprising:
   searching said list of security identifiers having associated times;
   selecting a security identifier having an earliest time; and
   retrieving said internal address associated with said selected identifier.

14. The method of claim 9, wherein said creating comprises:
receiving an encrypted packet having a security identifier from a device associated with one of said internal addresses;
determining a time said encrypted packet was received;
associating said time and said internal address with said security identifier; and
storing said security identifier with said associated time and internal destination address.

15. A secure connection manager, comprising:
a flow module to create a list of unmatched flows comprising security identifiers to designate secure connections by storing security identifiers in response to receiving initial encrypted packets addressed to a secure port, with each security identifier representing a secure flow terminating at a device with an internal address; and
a translation module to select an internal address for an initial encrypted packet having an external address and a security identifier, said internal address associated with an oldest or most recently active unmatched flow from said list, and to translate said external address to said internal address for a subsequent encrypted packet having a security identifier that matches said security identifier of said initial encrypted packet.

16. The secure connection manager of claim 15, further comprising:
a communication module to communicate said encrypted packet to said selected internal address.

17. A system to manage secure connections, comprising:
a first network node to send encrypted packets to an external address;
a second network node to receive said encrypted packets and translate said external address to an internal address using a list of security identifiers; and
a third network node having said internal address to receive said encrypted packets,
wherein said second network node receives a first initial encrypted packet transmitted from said third network node and addressed to a secure port of said first network node, said second network node records an unmatched flow comprising an internal address and a security identifier associated with said first initial encrypted packet in said list of security identifiers to designate a secure connection between said third network node and said first network node, said second network node translates said external address of a second initial encrypted packet having a security identifier received from said first network node by selecting an internal address associated an oldest or most recently active unmatched flow recorded in said list, said second network node communicates said second initial encrypted packet to said selected internal address, and said second network node forwards a subsequent encrypted packet having a security identifier that matches said security identifier of said second initial encrypted packet to said selected internal address.

18. The system of claim 17, wherein said second network node is a router configured to perform natural address translation (NAT).

19. The system of claim 17, wherein said first and third network nodes are configured to communicate using a tunnel created in accordance with the Internet Security Association And Key Management Protocol (ISAKMP).

20. The system of claim 17, wherein said encrypted packets are Internet Protocol (IP) Encapsulating Security Payload (ESP) encrypted packets.

21. The system of claim 7, wherein said second network node performs said translation using a list of flow identifiers, with each flow identifier representing a security parameter index (SPI) and having an associated internal address and receipt time.

22. An article comprising:
a storage medium;
said storage medium including stored instructions that, when executed by a processor, result in managing a secure connection by receiving a first initial encrypted packet transmitted from an internal node and addressed to a secure port of an external node, recording an unmatched flow comprising an internal address and a security identifier associated with said first initial encrypted packet in a list to designate a secure connection between said internal node and said external node, receiving a second initial encrypted packet having a security identifier and an external address that represents a plurality of internal addresses, translating said external address of said second initial encrypted packet by selecting one of said internal addresses associated with an oldest or most recently active unmatched flow recorded in said list, communicating said second initial encrypted packet to said selected internal address, and forwarding a subsequent encrypted packet having a security identifier that matches said security identifier of said second initial encrypted packet to said selected internal address.

23. The article of claim 22, wherein the stored instructions, when executed by a processor, further result in selecting one of said internal addresses by searching a list of security identifiers having associated times, selecting a security identifier having an earliest time, and retrieving said internal address associated with said selected security identifier.

24. The article of claim 23, wherein the stored instructions, when executed by a processor, further result in searching said list of security identifiers by creating said list, and searching said created list.

25. The article of claim 24, wherein the stored instructions, when executed by a processor, further result in creating said list by receiving an encrypted packet having a predetermined sequence number and a security identifier from a device associated with one of said internal addresses, determining a time said encrypted packet was received, associating said time and said internal address with said security identifier, and storing said security identifier with said associated time and associated internal address.

26. An article comprising:
a storage medium;
said storage medium including stored instructions that, when executed by a processor, result in managing secure connections by creating a list of ummatched flows comprising security identifiers to designate secure connections by storing security identifiers in response to receiving initial encrypted packets addressed to a secure port, with each security identifier representing a tunnel terminating at a device having an internal address, translating each of said internal addresses to an external address, receiving an initial encrypted packet having said external address and a security identifier, translating said external address of said initial encrypted packet by selecting one of said internal addresses associated with an oldest or most recently active unmatched flow, communicating said initial encrypted packet to said selected internal address, and forwarding a subsequent encrypted packet having a security identifier that matches said security identifier of said initial encrypted packet to said selected internal address.

27. The article of claim 26, wherein the stored instructions, when executed by a processor, further result in selecting one of said internal addresses by searching said list of security identifiers having associated times, selecting a security identifier having an earliest time, and retrieving said internal address associated with said selected security identifier.

28. The article of claim 26, wherein the stored instructions, when executed by a processor, further result in creating said list of security identifiers by receiving an encrypted packet having a security identifier from a device associated with one of said internal addresses, determining a time said encrypted packet was received, associating said time and said internal address with said security identifier, and storing said security identifier with said associated time and internal destination address.

* * * * *

UNITED STATES PATENT AND TRADEMARK OFFICE
CERTIFICATE OF CORRECTION

PATENT NO. : 7,159,109 B2 Page 1 of 1
APPLICATION NO. : 10/005972
DATED : January 2, 2007
INVENTOR(S) : Egevang It is certified that error appears in the above-identified patent and that said Letters Patent is hereby corrected as shown below:

In column 11, line 53, in Claim 17, after "associated" insert -- with --.

In column 12, line 4, in Claim 21, after "claim 7" and insert -- claim 17 --, therefor.

In column 12, line 56, in Claim 26, delete "ummatched" and insert -- unmatched --, therefor.

Signed and Sealed this

Second Day of October, 2007

JON W. DUDAS
*Director of the United States Patent and Trademark Office*